(12) United States Patent
Kommrusch et al.

(10) Patent No.: US 7,865,879 B1
(45) Date of Patent: Jan. 4, 2011

(54) EFFICIENT BRANCH TRACE MESSAGING WITH HARDWARE DEBUG FEATURES

(75) Inventors: Steven Kommrusch, Fort Collins, CO (US); Ashley P. Doriss, Longmont, CO (US)

(73) Assignee: Globalfoundries Inc.

( * ) Notice: Subject to any disclaimer, the term of this patent is extended or adjusted under 35 U.S.C. 154(b) by 1910 days.

(21) Appl. No.: 10/425,517

(22) Filed: Apr. 29, 2003

(51) Int. Cl.
*G06F 9/44* (2006.01)

(52) U.S. Cl. .................................................. 717/124
(58) Field of Classification Search ................... 717/124
See application file for complete search history.

(56) References Cited

U.S. PATENT DOCUMENTS

| | | | |
|---|---|---|---|
| 6,145,122 A * | 11/2000 | Miller et al. ................. | 717/129 |
| 6,247,146 B1 | 6/2001 | Wheatley et al. | |
| 6,430,675 B1 | 8/2002 | Hsu et al. | |
| 6,918,065 B1 * | 7/2005 | Edwards et al. ................ | 714/45 |
| 7,051,239 B2 * | 5/2006 | Litt ............................. | 714/42 |
| 7,308,681 B2 * | 12/2007 | Ekanadham et al. ......... | 717/128 |
| 2001/0054175 A1 * | 12/2001 | Watanabe ....................... | 717/4 |
| 2002/0178405 A1 * | 11/2002 | McCullough et al. ......... | 714/45 |
| 2003/0233601 A1 * | 12/2003 | Vaid et al. ..................... | 714/42 |

\* cited by examiner

*Primary Examiner*—Philip Wang

(57) ABSTRACT

Compression of branch trace messaging information differs for a mode employed for software debug or optimization, in which the information is tightly packed, than for a mode employed for hardware debug, in which executed instruction addresses are more frequently included to better support detection of incorrect branch jumps. In addition, compression of branch trace messaging information may be selectively adapted in at least one of the two modes to provide executed instruction addresses at greater frequency, up to an address for each instruction executed within a particular code segment.

7 Claims, 3 Drawing Sheets

US 7,865,879 B1

EFFICIENT BRANCH TRACE MESSAGING WITH HARDWARE DEBUG FEATURES

TECHNICAL FIELD OF THE INVENTION

The present invention is directed, in general, to debugging facilities for processor design and/or software optimization and, more specifically, to branch trace messaging for hardware debug or software optimization.

BACKGROUND OF THE INVENTION

Branch trace messaging is employed in processors and other programmable integrated circuits for design test and verification and software optimization. Existing branch trace messaging schemes support some compression of instruction execution flow, mainly for software debug. However, these schemes typically assume that the processor properly executed the instruction in memory.

There is, therefore, a need in the art for more detailed information, particularly during early system bring up, in order to support analysis of possible incorrect instruction execution by the processor hardware.

SUMMARY OF THE INVENTION

To address the above-discussed deficiencies of the prior art, it is a primary object of the present invention to provide, for use in a processor architecture, compression of branch trace messaging information that differs for a mode employed for software debug or optimization, in which the information is tightly packed, than for a mode employed for hardware debug, in which executed instruction addresses are more frequently included to better support detection of incorrect branch jumps. In addition, compression of branch trace messaging information may be selectively adapted in at least one of the two modes to provide executed instruction addresses at greater frequency, up to an address for each instruction executed within a particular code segment.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1A:
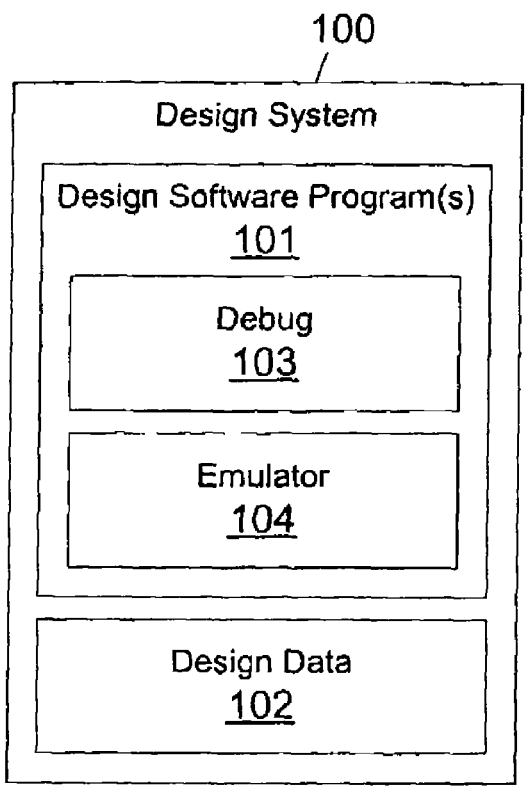
FIGS. 1A through 1C depict a processor design system, processor architecture, and data processing system, respectively, each incorporating and/or utilizing branch trace messaging according to one embodiment of the present invention.
Figure 1C:
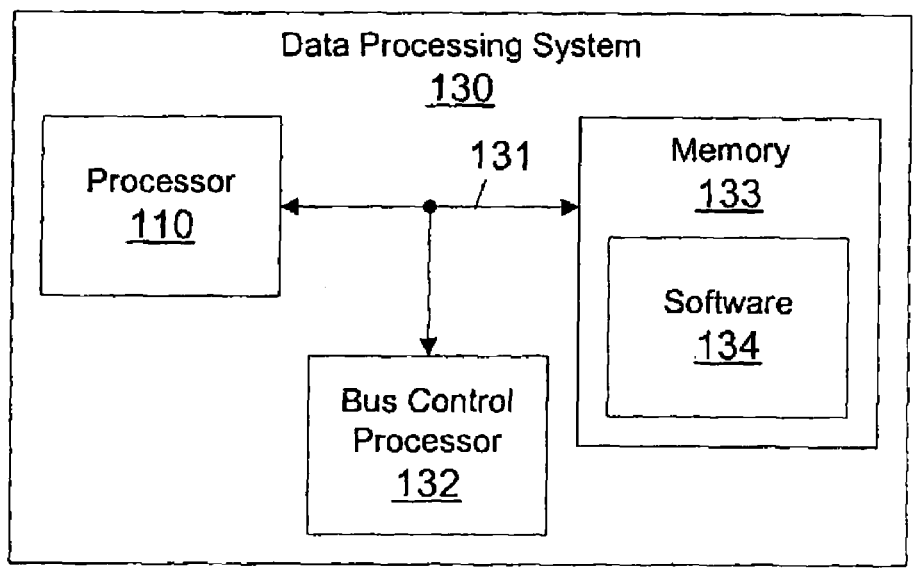
Figure 1B:
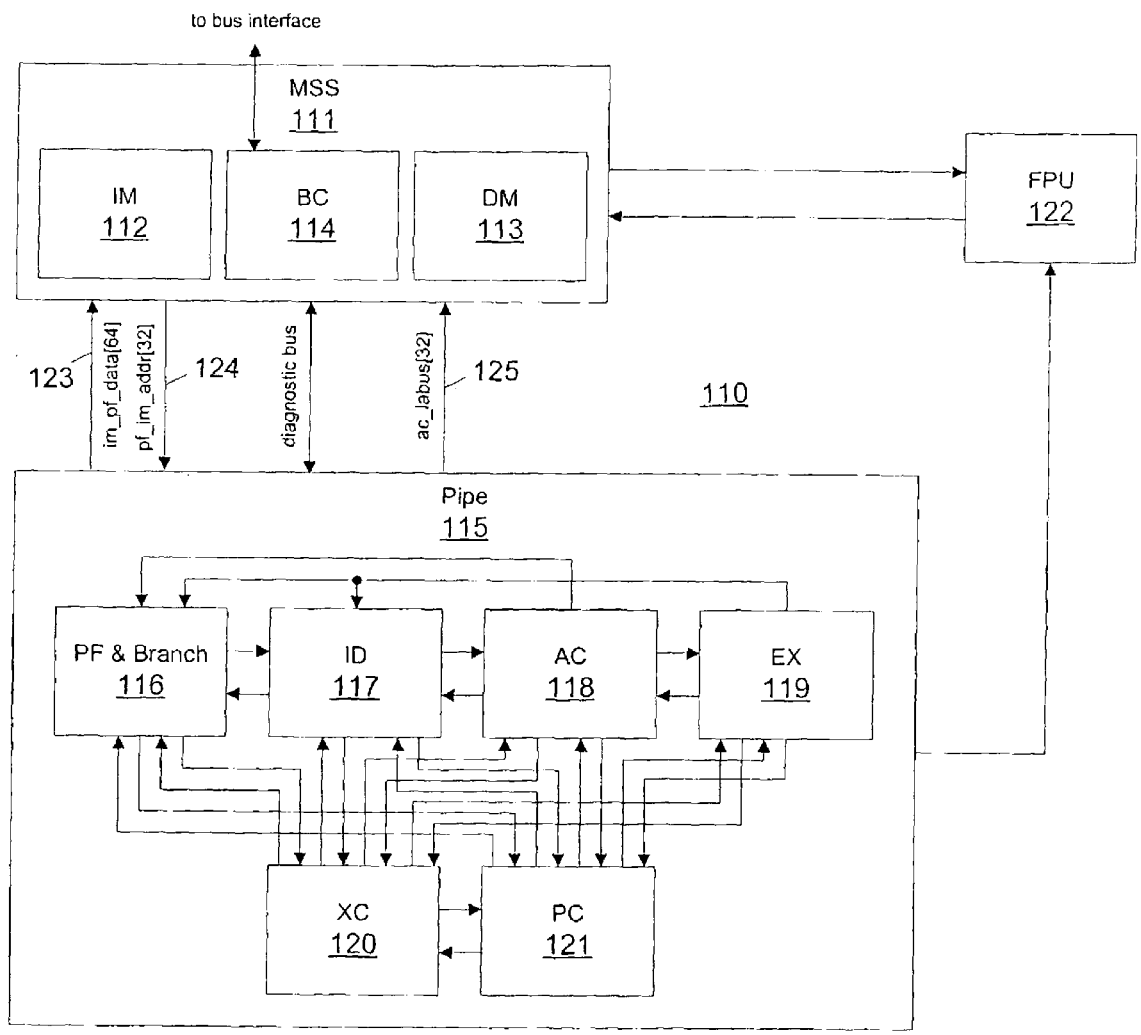
Figure 2:
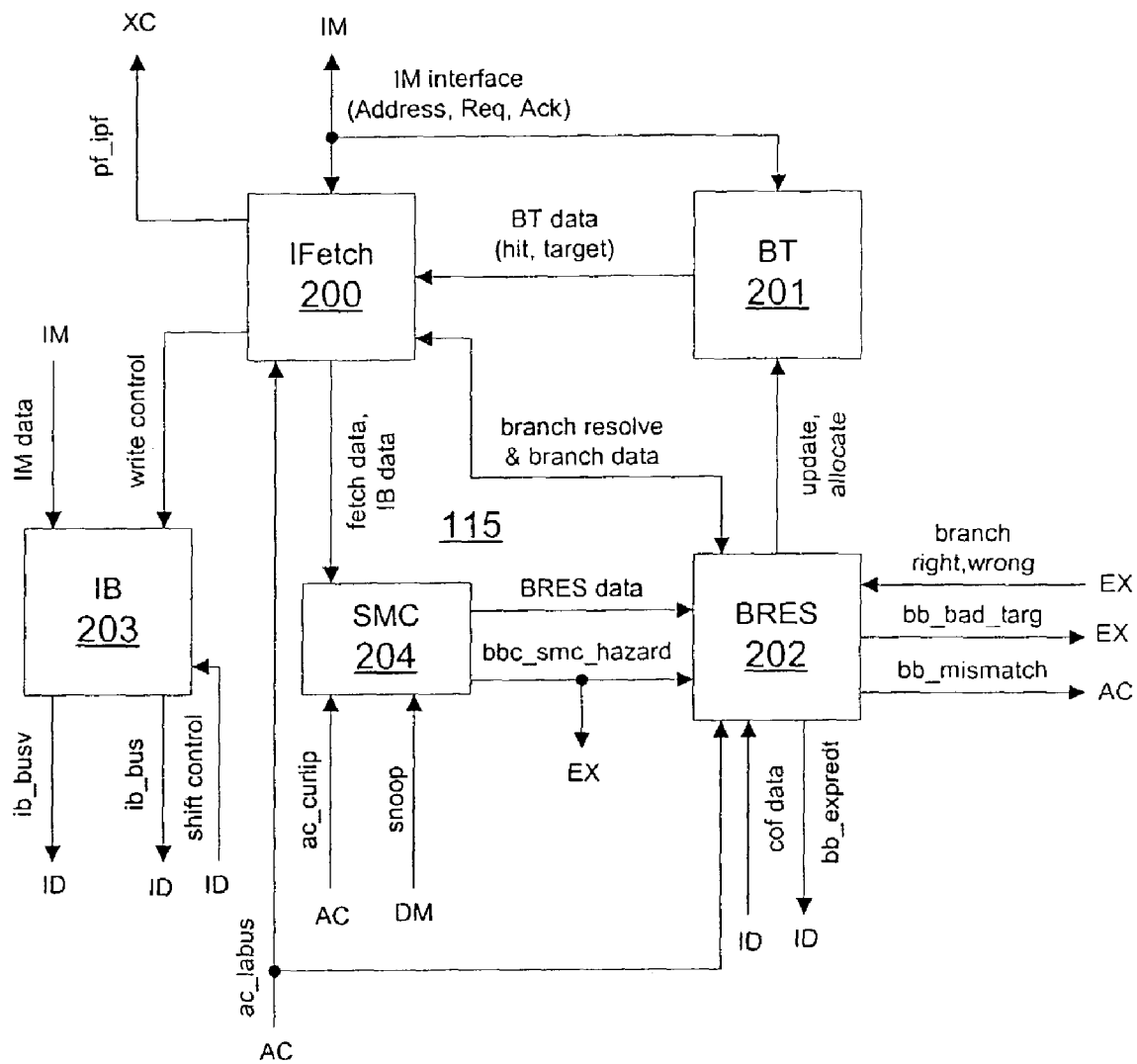
FIG. 2 depicts in greater detail a prefetch and branch stage within a processor employing branch trace messaging according to one embodiment of the present invention.

FIGS. 1A through 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIGS. 1A through 1C depict a processor design system, processor architecture, and data processing system, respectively, each incorporating and/or utilizing branch trace messaging according to one embodiment of the present invention. Those skilled in the art will recognize that the full construction and operation of a processor design system, processor, or data processing system are not depicted or described herein. Instead, for simplicity and clarity, only so much of the construction and operation of such systems as is unique to the present invention or necessary for an understanding of the present invention is depicted and described.

FIG. 1A depicts a processor design system 100, which includes design software program(s) 101 selectively executed on one or more data processing systems (not separately depicted). Design program(s) 101 produce electronic design data 102 for a processor design, which may include circuit descriptions, physical layouts for masks, and the like. In the exemplary embodiment, design program(s) 101 include a debug facility 103 for debugging a processor design defined by design data 102 and an emulator 104 for simulating operation of a processor conforming to design data 102.

FIG. 1B depicts a fabricated processor conforming to design data 102 produced by design system 100. Preferably x86 compatible, processor 110 includes a memory subsystem (MSS) 111 containing bifurcated level one (L1) instruction and data cache memories (IM) 112 and (DM) 113, respectively, coupled to an external bus or buses via a bus controller (BC) 114 and a bus interface (not shown). Coupled to the memory subsystem 111 is an instruction pipe 115, which in the exemplary embodiment is a single-issue, single precision floating point pipeline optimized for 3DNow! and multimedia extension (MMX) instructions.

Pipeline 115 is partitioned into a prefetch and branch (PF) stage 116, an instruction decode (ID) stage 117, address calculation (AC) stage 118, execute and write back (EX/WB) stage 119, a pipeline control (PC) unit 120, and one or more exception control (XC) units 121. In the exemplary embodiment, processor 110 includes a floating point unit (FPU) 122 coupled the output of pipeline 115, as well as to memory subsystem 111, for executing floating point operations, while non-floating point operations are executed in the execution stage 119.

Pipeline 115, and specifically prefetch and branch stage 116, is coupled to instruction cache memory 112 by an instruction bus (pf_im_addr[32]) 123 on which 32 bit instruction addresses are transmitted and a data bus (im_pf_data [64]) 124 on which 64 bit instructions are retrieved. Prefetch and branch stage 115 is also coupled to data cache memory 113 by a 32 bit address calculation linear address bus (ac_la-bus[32]) 125.

Prefetch and branch stage 116 fetches raw instruction data from the instruction cache memory 112 and sends retrieved instruction data to the instruction decode stage 117, which may include, for example, predecode (PD) logic, instruction decode (ID) logic, and an instruction queue (IQ). After the instruction decode stage 117 determines the length of the current instruction, the instruction decode stage 117 signals the starting point of the next instruction to the prefetch and branch stage 116 so that prefetch and branch stage 116 may refill internal buffers as necessary.

Prefetch and branch stage 116 also attempts to predict the target of conditional branches. If prefetch and branch stage 116 detects a jump, the logic therein attempts to predict whether the jump will be taken, together with a target of the jump. As described in further detail below, prefetch and branch stage 116 supports two modes of branch trace messaging (BTM), one for hardware debug and one for software optimization, with variable compression.

Functional blocks within processor 110, including prefetch and branch stage 116, are each coupled to a 64 bit diagnostic (scope) bus daisy-chained from block to block. The diagnostic bus provides the capability to observe internal signals within processor 110, set breakpoints at specific conditions, and to monitor conditions for performance and/or data collection.

FIG. 1C depicts a data processing system 130 employing processor 110. Within data processing system 130, processor 110 is coupled to a bus 131 controlled by a bus control processor 132. Bus 131 communicably couples processor 110 to memory 133, which typically includes: a read only memory (ROM) containing a basic input-output system (BIOS) and similar system level data; random access memory (RAM), including one or more level two (L2) or lower cache memories for staging data into processor 110 and containing software 134 in the form of program instructions and data for an operating system (OS) and applications currently being executed; and a hard disk drive containing software 134 in the form of an operating system and application(s) which may be selectively loaded and executed. In addition, data processing system 130 typically includes a user interface including a display and input devices such as a keyboard and a mouse or other pointing device, which are not illustrated.

The diagnostic bus within processor 110 is at least selectively coupled to bus control processor 132 via bus controller 114, transporting data to the bus control processor 132, which provides the functionality allowing the signals on the diagnostic bus to be observed at the pins. Bus control processor 132 also sets breakpoints based on the data on the diagnostic bus, and monitors data selection from the diagnostic bus.

Data processing system 130 in FIG. 1C is representative of both an end user system, within which software 134 is an executable user application, and a software development system, within which software 134 includes both source code for the executable user application and a software development (programming) environment having optimization tools for optimizing the source code for execution on processor 110.

FIG. 2 depicts in greater detail a prefetch and branch stage within a processor employing branch trace messaging according to one embodiment of the present invention. The major connectivity of prefetch and branch stage 115 includes an instruction fetch (IFetch) block 200 interfacing to and fetching instruction code from instruction memory. Code fetches are based on input from branch target (BT) logic 201, branch resolution (BRES) logic 202, instruction decode (ID) logic, and the address calculation (AC) unit. Data returned by the instruction memory is placed in the instruction buffer (IB) 203, from which instruction decode logic reads instruction data for decoding.

Branch target (buffer) logic 201 "snoops" transactions between the prefetch and branch stage 115 and instruction memory to look for addresses that match data stored in a branch target buffer (BTB). A hit causes the instruction fetch logic 200 to start fetching at the supplied target address.

Branch resolution logic 202 stores data about each branch detected by the instruction decode logic, allowing for correction of code flow if branch prediction is incorrect. In addition, branch resolution logic 202 issues update/allocate data to the branch target logic 201 when branches resolve in the execution stage, and provides address ranges of code contained in the pipe from the prefetch and branch stage 116 to the address calculation stage 116 for the self-modifying code (SMC) block 204 to check for hazards. Self-modifying code block 204 checks for self-modifying code hazards for any instructions contained in the pipe from prefetch and branch stage 116 to the address calculation stage 118, and re-fetches code when a hazard is detected.

As described above, the prefetch and branch stage is connected to the diagnostic bus to provide diagnostic information and to enable branch trace messaging. Instruction execution flow information is accumulated by the prefetch and branch stage and encoded for transmission on the diagnostic bus. In order to use branch trace messaging, the prefetch and branch stage is configured to connect to the diagnostic bus, and the bus control processor 132 is configured to receive branch trace messages at a first-in, first-out (FIFO) buffer, then shift the messages out onto off-chip diagnostic pins. Branch trace messaging may be turned on within the processor 110, and support for branch trace messaging activated within the bus controller 114 and bus control processor 132, by setting special mode registers within the respective devices.

For normal processor operation, branch trace messaging support is turned off in the bus control processor 132, and no branch trace messaging support registers should be switched on or enabled in order to save power.

In software debug (or optimization) branch trace messaging mode, the hardware is assumed to be working and the code being executed is assumed to be non-self-modifying. The instruction execution flow is compressed into as small a size as possible, which, using the approach described below, should average less than 1 bit per instruction traced.

In hardware debug mode, however, as much useful information regarding instruction trace as possible is pumped out each cycle. Hardware debug mode can thus catch incorrect changes of flow due to a variety of hardware bugs. In the exemplary embodiment, sixteen output pins are employed for the diagnostics, running at half the processor clock, so only 8 bits/clock maximum can be averaged. Most of the instruction flow is compressed in hardware debug mode, but every eight instructions generate the full 32 bit instruction address.

Branch trace messaging assembles branch resolution information for encoding into a fixed style format that is sent across all 64 bits of the diagnostics bus. Thus, all branch trace messaging modes require the diagnostics bus control registers within the processor 110 and the bus control processor 132 to be programmed so that the appropriate branch trace messaging mode (hardware debug or software optimization) is selected for the diagnostics bus.

The 64 bit branch trace messaging data packets have three sections. The first two most significant bits (MSBs), bits 63:62, determine the type of data on the diagnostics bus. Bits 61:32 contain all the necessary information to determine the execution path taken, while bits 31:0 contain the address of the next instruction to be executed. When the bus control processor 132 is set up to store data in branch trace messaging mode, addresses that are not valid are automatically removed to reduce the amount of trace data.

In the exemplary embodiment, the 64 bit processor diagnostics bus outputs one of four data packet types each cycle: invalid packed data (diag[63:62]=00b); valid packed data, no address (diag[63:62]=10b); valid packed data with valid address of next instruction to execute in a 32 bit code segment (diag[63:62]=11b); or valid packed data with valid address of next instruction to execute in a 16 bit code segment (diag[63:62]=01b).

The branch trace messaging functionality stores trace data starting with the least significant bits (LSBs) of each data packet and shifts the data to the left until the packet fills up. When a packet fills, a valid data packet is sent out. In software optimization mode, certain instructions or external events may force both a data and address packet to be sent out. In such an event, the data packet is cleared and accumulation of branch information is started again. Starting with the left side of the data packet, the following information may be utilized to decode the data packet: 00—no data; 01xxxxxxxx (a 10 bit field)—0-255 non-branching instructions executed; 10—branch encountered due to instruction in code flow, branch taken; 11—branch encountered due to instruction in code flow, branch not taken; and 01 (in LSBs only)—branch caused by external interrupt, taken.

When 249 instructions have been executed, the pattern 01 is shifted from the right into the data packet followed by the bit pattern 11111001, representing 249 instructions. If a code-induced branching instruction is executed, all instruction count data is removed from the packet in order to save packet space. If the packet fills up, a packet will be sent out with the data intact.

In addition, if an external interrupt occurs, the packet is not compressed, but instead an additional 01 pattern is shifted into the packet and the number of instructions that were executed since the last packet update is shifted in from the right. Lastly, the pattern 01 is shifted in at the end to indicate that an external interrupt has occurred. If there is not enough room in the packet for all this information, then two packets will be sent in chronological order. The second packet will contain the 01 pattern in the LSBs of the data packet, as well as the address of the interrupt handler that processor will be executing. In this case, the control bits will properly indicate that the address is not valid for the first packet, but is valid for the second.

For software optimization branch trace messaging mode, the following execution events cause a packet to be sent:

when the number of instructions since the last address was sent is greater than 1016 (3F8h), then a valid data packet and address will be sent;

when the number of instructions since the last branch is greater than 248 (F8h) and the data packet does not have enough space for the 10 bit field, a valid data packet will be sent;

if a branch is resolved and the 2 bit filed fills the data packet, then a valid data packet will be sent;

if an external interrupt event—e.g., system management interrupts (SMIs)—occurs, then both a valid data and address packet will be sent;

if a debug stall or suspend occurs, the branch trace messaging functionality will send out both a data and address packet after coming out of suspend or debug stall;

if a branch instruction resolves as taken and the address is not instruction pointer (IP) relative, a valid data packet and address will be sent (the class of instructions that cause non-ip-relative branches includes far jumps, interrupt instructions, far calls, return instructions such as RET, RSM and RDM, and near jumps which utilize a register offset); and if a serializing instruction is executed, both a data packet and address packet are sent (serializing instructions, for which the address is the linear address of the next instruction, include MOV to a CR register, MOV to a debug register, WRMSR, INVD, INVLPG, WBINVD, LGDT, LLDT, LIDT, LTR, CPUID, RSM, and IRET).

It should be noted that, by inserting serializing instructions appropriately within an executed code segment, the frequency of instruction address within encoded branch trace messages may be adapted, to the point where an instruction address for each executed instruction may be transmitted.

A summary of the information encoded on the diagnostic bus during branch trace messaging in software optimization mode is listed below in TABLE I:

TABLE I

```
6 6 6 6 5 5 5 5 5 5 5 5 5 5 4 4 4 4 4 4 4 4 4 4 3 3 3 3 3 3 3 3
3 2 1 0 9 8 7 6 5 4 3 2 1 0 9 8 7 6 5 4 3 2 1 0 9 8 7 6 5 4 3 2
CL                          Data Packet
3 3 2 2 2 2 2 2 2 2 2 2 1 1 1 1 1 1 1 1 1 1 0 0 0 0 0 0 0 0 0 0
1 0 9 8 7 6 5 4 3 2 1 0 9 8 7 6 5 4 3 2 1 0 9 8 7 6 5 4 3 2 1 0
                            Address
```

| BIT | Description |
|---|---|
| 63:62 | BTM control bits(CL)<br>00b = Nop. The data packet and address are not meaningful.<br>10b = Data packet valid, address is meaningless.<br>11b = Data packet and address are valid. The address corresponds to the next address to be executed and is located in a 32 bit code segment.<br>01b = Data packet and address are valid. The address corresponds to the next address to be executed and is located in a 16 bit code segment. |
| 61:32 | Data packet<br>The data packet is organized in 2 bit or 10 bit fields as follows:<br>00b = no data<br>01_XXX_XXXXb = 0 to 255 non-branching instructions since last branch. The first two bits serve as a field flag and the last eight bits contain the count value.<br>10b = A code induced branch is resolved as taken.<br>11b = A code induced branch is resolved as not taken.<br>01b(in LSBs only) = An external interrupt has caused a change of flow in the execution stream. |
| 31:0 | The 32 bit linear address |

Some examples of decoding a branch trace messaging trace in software optimization mode include:

Data packet=0xc000000a Address=0x605a0: The processor has taken an instruction pointer relative jump and then took a non-instruction pointer relative branch to a 32 bit code segment. The target address is 0x605a0h and is located in a 32 bit code segment.

Data packet=0x4000000e Address=0x7540: The processor did not take a conditional jump and then took a non-instruction pointer relative branch to a 16 bit code segment. The target address is 0x7540h and is located in a 16 bit code segment.

Data packet=0xc9f97e5f9: The processor has executed 249 instructions three times without encountering a branch.

Data packet=0xc0000415 Address=0x36012d: The processor has executed five instructions since the last packet was sent. Then the processor received an external interrupt and the target address is 0x36012d located in a 32 bit code segment.

From the perspective of the bus control processor 132, with the compression format described above, the processor diagnostic bus outputs one type of packet each cycle: invalid packed data (bit 63 and 62 both clear); valid packed data (bit 63 set, bit 62 clear); or valid packed data including the address of the next instruction to execute (bit 62 set). A valid packet stores trace data chronologically from MSB (61) to LSB (32) in two or ten bit fields where 00 indicates no data, 01xxxxxx indicates 0-255 instructions were executed, 10 indicates a branch was encountered and taken, and 11 indicates a branch was encountered and not taken. A packet containing 1001000011110100001111101000001111 is not normally possible since the packet indicates that three sets of 15 instructions were run, which would normally coalesce into one set of 45 instructions. Accordingly, that packet content is utilized to signal entry into system management mode (SMM), while 10010000000010000000000100000000 signals exiting from SMM.

A sample cycle-by-cycle data stream for branch trace messaging in software optimization mode is listed below:

```
00000000 00000000 00000000 00000000    # data invalid, not stored in
FIFO
00000000 00000000 00000000 00000010    # invalid, shift in "branch
taken"
00000000 00000000 00000000 00000010    # invalid, no shift this cycle
00000000 00000000 00000000 00001011    # invalid, shift in "not taken"
00000000 00000000 00000000 00001011    # invalid, no shift
00000000 00000000 00000000 00001011    # invalid, no shift
00000000 00000000 00000000 00001011    # invalid, no shift
00000000 00000000 00000000 00001011    # invalid, no shift
00000000 00000000 00000000 00101111    # invalid, shift in "not taken"
    ...(possibly 100's of instructions and 1000's of cycles later)...
00001011 11101010 10111010 10101110    # invalid
10101111 10101010 11101010 10111010    # valid, will be stored in FIFO
                                        # shift in "branch taken"
                                        # next word is packed BTM
00000000 00000000 00000000 00000000    # data invalid, not stored in
FIFO
00000000 00000000 00000000 00000010    # invalid, shift in "branch
taken"
00000000 00000000 00000000 00000010    # invalid, no shift
    ...(50 non-branch instructions later)...
00000000 00000000 00000000 00000010    # invalid, no shift
11000000 00000000 00001001 00110010    # valid, will be stored in FIFO
                                        # shift in "executed 50 instr."
                                        # next word is instr. Address
00100000 10101011 11001101 11101111    # address=0x20ABCDEF, will
store
00000000 00000000 00000000 00000000    # data invalid, not stored in
FIFO
```

Branch trace messaging in hardware debug mode employs a compression format identical to that described above, but with a valid data and address packet sent for every eight instructions executed, or sooner under the conditions: a serializing instruction is executed; an external interrupt occurs; or a non-instruction pointer relative branch is taken. A summary of the information encoded on the diagnostic bus during branch trace messaging in hardware debug mode is listed below in TABLE II:

TABLE II

| 6 6 6 6 5 5 5 5 5 5 5 5 5 5 4 4 4 4 4 4 4 4 4 4 3 3 3 3 3 3 3 3 |
|---|
| 3 2 1 0 9 8 7 6 5 4 3 2 1 0 9 8 7 6 5 4 3 2 1 0 9 8 7 6 5 4 3 2 |
| CL                          Data Packet |
| 3 3 2 2 2 2 2 2 2 2 2 2 1 1 1 1 1 1 1 1 1 1 0 0 0 0 0 0 0 0 0 0 |
| 1 0 9 8 7 6 5 4 3 2 1 0 9 8 7 6 5 4 3 2 1 0 9 8 7 6 5 4 3 2 1 0 |
|                                 Address |

| BIT | Description |
|---|---|
| 63:62 | BTM control bits(CL)<br>00b = Nop. The data packet and address are not meaningful.<br>10b = Data packet valid, address is meaningless.<br>11b = Data packet and address are valid. The address corresponds to the next address to be executed and is located in a 32 bit code segment.<br>01b = Data packet and address are valid. The address corresponds to the next address to be executed and is located in a 16 bit code segment. |
| 61:32 | Data packet<br>The data packet is organized in 2 bit or 10 bit fields as follows:<br>00b = no data<br>01_XXX_XXXXb = 0 to 255 non-branching instructions since last branch. The first two bits serve as a field flag and the last eight bits contain the count value.<br>10b = A code induced branch is resolved as taken.<br>11b = A code induced branch is resolved as not taken.<br>01b(in LSBs only) = An external interrupt has caused a change of flow in the execution stream. |
| 31:0 | The 32 bit linear address |

From the perspective of the bus control processor 132, with the compression format described above, the processor diagnostic bus output appear identical to that described above, except the full address is dumped at least every eight instructions, resulting in alternating packed packets with address transfers in the FIFO. A sample cycle-by-cycle data stream for branch trace messaging in hardware debug mode is listed below:

```
00000000 00000000 00000000 00000000    # invalid, "branch taken"
00000000 00000000 00000000 00000010    # invalid, no shift
00000000 00000000 00000000 00000010    # invalid, no shift
00000000 00000000 00000000 00001011    # invalid, shift in "not taken"
00000000 00000000 00000000 00001011    # invalid, no shift
00000000 00000000 00000000 00001011    # invalid, no shift
00000000 00000000 00000000 00001011    # invalid, no shift
00000000 00000000 00000000 00001011    # invalid, no shift
11000000 00000000 00101101 00000100    # valid, will be stored in FIFO
                                        # shift in "executed 4 instr."
                                        # next word is instr. address
00110001 00100011 01000101 01100111    # address=0x31234567, will
store
```

The present invention supports a compressed branch trace messaging format that works well in both software debug/optimization and hardware debug, with a maximum compression of less than one bit per instruction executed. However, to accommodate the requirements of analyzing incorrect branch jumps during hardware debug, the system can optionally be configured to generate long packets in the branch trace messaging stream to provide, more frequent instruction execution addresses, even to the point of storing every single address executed into a FIFO. The present invention thus provides optimally packed branch trace messaging information for different modes, with densely packed messages supporting software debug or optimization and more loosely packed messages supporting improved hardware debug.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A method, comprising:
   determining a mode of operation of a processor;
   in response to determining the mode of operation is a software debug mode, communicating to a processor device a first set of executed instruction addresses at a first rate, the first set of executed instruction addresses associated with a set of instructions, the first rate based on a number of serializing instructions in the set of instructions; and
   in response to determining the mode of operation is a hardware debug mode, communicating to the processor device a second set of executed instruction addresses at a second rate, the second set of executed instruction addresses associated with the set of instructions the second rate based on the number of serializing instructions in the set of instructions.

2. The method of claim 1, further comprising:
   in response to determining the mode of operation is the software debug mode, changing the first rate in response to receiving an interrupt at the processor.

3. The method of claim 1, further comprising:
   in response to determining the mode of operation is the software mode, changing the first rate in response to determining the set of instructions is associated with a non-instruction pointer relative branch.

4. The method of claim 1, wherein communicating the first set of executed instruction addresses comprises communicating the first set of executed instruction addresses to a diagnostic bus of the processor device.

5. A processor device, comprising:
   a diagnostic bus,
   an instruction pipe coupled to the diagnostic bus, the instruction pipe configured to:
      in response to determining a mode of operation of a processor is a software debug mode, communicate a first set of executed instruction addresses to the diagnostic bus at a first rate, the first set of executed instruction addresses associated with a set of instructions, the first rate based on a number of serializing instructions in the set of instructions; and
      in response to determining the mode of operation is a second debug mode, communicate a second set of executed instruction addresses to the diagnostic bus at a second rate, the second set of executed instruction addresses associated with the set of instructions, the second rate based on the number of serializing instructions in the set of instructions.

6. The device of claim 5, wherein the instruction pipe is configured to:
   in response to determining the mode of operation is the software debug mode, change the first rate in response to receiving an interrupt at the processor.

7. The device of claim 5, wherein the instruction pipe is configured to:
   in response to determining the mode of operation is the software debug mode, change the first rate in response to determining the set of instructions includes a non-instruction pointer relative branch.

* * * * *

UNITED STATES PATENT AND TRADEMARK OFFICE
CERTIFICATE OF CORRECTION

| | | |
|---|---|---|
| PATENT NO. | : 7,865,879 B1 | Page 1 of 1 |
| APPLICATION NO. | : 10/425517 | |
| DATED | : January 4, 2011 | |
| INVENTOR(S) | : Steven Kommrusch et al. | |

It is certified that error appears in the above-identified patent and that said Letters Patent is hereby corrected as shown below:

Column 9, Line 36, change "software mode" to --software debug mode--

Signed and Sealed this
Eleventh Day of October, 2011

David J. Kappos
*Director of the United States Patent and Trademark Office*